United States Patent
Idika et al.

(10) Patent No.: US 10,567,386 B2
(45) Date of Patent: Feb. 18, 2020

(54) SPLIT SERVING OF COMPUTER CODE

(71) Applicant: Shape Security, Inc., Mountain View, CA (US)

(72) Inventors: Nwokedi Idika, Mountain View, CA (US); Justin D. Call, Santa Clara, CA (US)

(73) Assignee: Shape Security, Inc., Mountain View, CA (US)

( * ) Notice: Subject to any disclaimer, the term of this patent is extended or adjusted under 35 U.S.C. 154(b) by 0 days.

(21) Appl. No.: 16/236,520

(22) Filed: Dec. 30, 2018

(65) Prior Publication Data
US 2019/0245858 A1  Aug. 8, 2019

Related U.S. Application Data

(63) Continuation of application No. 15/204,710, filed on Jul. 7, 2016, now Pat. No. 10,230,718.
(Continued)

(51) Int. Cl.
| | |
|---|---|
| *H04L 29/06* | (2006.01) |
| *G06F 21/55* | (2013.01) |

(Continued)

(52) U.S. Cl.
CPC ............... *H04L 63/10* (2013.01); *G06F 8/60* (2013.01); *G06F 21/31* (2013.01); *G06F 21/36* (2013.01);
(Continued)

(58) Field of Classification Search
None
See application file for complete search history.

(56) References Cited

U.S. PATENT DOCUMENTS

| | | | |
|---|---|---|---|
| 5,509,076 A | 4/1996 | Sprunk | |
| 6,654,707 B2 | 11/2003 | Wynn | |

(Continued)

FOREIGN PATENT DOCUMENTS

| | | |
|---|---|---|
| CN | 101471818 | 5/2011 |
| WO | WO2008/095018 | 8/2008 |

(Continued)

OTHER PUBLICATIONS

NOA, mailed on Feb. 7, 2019, re: Siying Yang, U.S. Appl. No. 16/190,015, filed Nov. 13, 2018.

(Continued)

*Primary Examiner* — Andrew J Steinle
(74) *Attorney, Agent, or Firm* — Wei & Sleman LLP (57) ABSTRACT

A computer-implemented method for securing a content server system is disclosed. The method includes identifying that a request has been made by a client computing device for serving of content from the content server system; serving, to the client computing device and for execution on the client computing device, reconnaissance code that is programmed to determine whether the client computing device is human-controlled or bot-controlled; receiving, from the reconnaissance code, data that indicates whether the client computing device is human-controlled or bot-controlled; and serving follow-up content to the client computing device, wherein the make-up of the follow-up content is selected based on a determination of whether the client computing device is human-controlled or bot-controlled.

20 Claims, 6 Drawing Sheets

Related U.S. Application Data (60) Provisional application No. 62/189,664, filed on Jul. 7, 2015.

(51) Int. Cl.
*G06F 21/36* (2013.01)
*G06Q 20/40* (2012.01)
*G06F 8/60* (2018.01)
*G06F 21/31* (2013.01)

(52) U.S. Cl.
CPC ......... *G06F 21/55* (2013.01); *G06Q 20/4016* (2013.01); *H04L 63/083* (2013.01); *H04L 63/1416* (2013.01); *H04L 63/1441* (2013.01); *G06F 2221/2103* (2013.01); *G06F 2221/2127* (2013.01); *G06F 2221/2133* (2013.01); *H04L 2463/144* (2013.01)

(56) References Cited

U.S. PATENT DOCUMENTS

| | | |
|---|---|---|
| 7,058,699 B1 | 6/2006 | Chiou |
| 7,107,347 B1 | 9/2006 | Cohen |
| 7,398,553 B1 | 7/2008 | Li |
| 7,424,720 B2 | 9/2008 | Chagoly |
| 7,464,326 B2 | 12/2008 | Kawai |
| 7,849,502 B1 | 12/2010 | Bloch et al. |
| 7,870,610 B1 | 1/2011 | Mitchell |
| 7,895,653 B2 | 2/2011 | Calo |
| 8,170,020 B2 | 5/2012 | Oliver |
| 8,195,953 B1 | 6/2012 | Yue |
| 8,453,126 B1 | 5/2013 | Ganelin |
| 8,555,388 B1 | 10/2013 | Wang |
| 8,561,193 B1 | 10/2013 | Srivastava |
| 8,578,499 B1 | 11/2013 | Zhu |
| 8,589,405 B1 | 11/2013 | Estan |
| 8,615,804 B2 | 12/2013 | Mui |
| 8,650,648 B2 | 2/2014 | Howard et al. |
| 8,677,481 B1 | 3/2014 | Lee |
| 8,689,330 B2 | 4/2014 | Sinn |
| 8,713,684 B2 | 4/2014 | Bettini |
| 8,726,394 B2 | 5/2014 | Maor |
| 8,739,284 B1 | 5/2014 | Gardner |
| 8,752,208 B2 | 6/2014 | Shulman |
| 8,762,962 B2 | 6/2014 | Ben-Artzi |
| 8,843,820 B1 | 9/2014 | Kay |
| 8,849,985 B1 | 9/2014 | Colton |
| 8,997,226 B1 * | 3/2015 | Call ..................... G06F 21/552 726/22 |
| 9,043,924 B2 | 5/2015 | Maor |
| 9,158,893 B2 | 10/2015 | Call |
| 9,225,729 B1 | 12/2015 | Moen |
| 9,225,737 B2 | 12/2015 | Call |
| 9,258,328 B2 | 2/2016 | Ibatullin et al. |
| 9,456,050 B1 | 9/2016 | Lepeska |
| 9,537,888 B1 | 1/2017 | McClintock |
| 9,609,006 B2 | 3/2017 | Call |
| 9,628,498 B1 | 4/2017 | Aziz |
| 9,639,699 B1 | 5/2017 | Kurupati |
| 9,646,140 B2 | 5/2017 | Horadan |
| 9,680,850 B2 | 6/2017 | Rapaport |
| 9,686,300 B1 | 6/2017 | Kurupati |
| 9,705,902 B1 | 7/2017 | Call |
| 9,906,544 B1 | 2/2018 | Kurupati |
| 10,165,004 B1 | 12/2018 | Mehta |
| 2002/0194219 A1 | 12/2002 | Bradley |
| 2002/0199116 A1 | 12/2002 | Hoene |
| 2004/0088651 A1 | 5/2004 | McKnight |
| 2005/0108554 A1 | 5/2005 | Rubin |
| 2005/0172338 A1 | 8/2005 | Sandu |
| 2005/0198099 A1 | 9/2005 | Motsinger |
| 2005/0216770 A1 | 9/2005 | Rowett |
| 2005/0240999 A1 | 10/2005 | Rubin |
| 2005/0251536 A1 | 11/2005 | Harik |
| 2005/0278626 A1 | 12/2005 | Malik |
| 2006/0053295 A1 | 3/2006 | Madhusudan |
| 2006/0101047 A1 | 5/2006 | Rice |
| 2006/0174323 A1 | 8/2006 | Brown |
| 2006/0195588 A1 | 8/2006 | Pennington |
| 2006/0230288 A1 | 10/2006 | Fox |
| 2006/0288418 A1 | 12/2006 | Yang |
| 2007/0011295 A1 | 1/2007 | Hansen |
| 2007/0064617 A1 | 3/2007 | Reves |
| 2007/0088955 A1 | 4/2007 | Lee |
| 2007/0234070 A1 | 10/2007 | Horning |
| 2008/0208785 A1 | 8/2008 | Trefler |
| 2008/0320567 A1 | 12/2008 | Shulman |
| 2009/0070459 A1 | 3/2009 | Cho |
| 2009/0099988 A1 | 4/2009 | Stokes |
| 2009/0199297 A1 | 8/2009 | Jarrett |
| 2009/0241174 A1 | 9/2009 | Rajan |
| 2009/0292791 A1 | 11/2009 | Livshits |
| 2010/0088404 A1 | 4/2010 | Mani |
| 2010/0106611 A1 | 4/2010 | Paulsen |
| 2010/0142382 A1 | 6/2010 | Jungck et al. |
| 2010/0186089 A1 | 7/2010 | Fu |
| 2010/0218253 A1 | 8/2010 | Sutton |
| 2010/0235637 A1 | 9/2010 | Lu |
| 2010/0235910 A1 | 9/2010 | Ku |
| 2010/0287132 A1 | 11/2010 | Hauser |
| 2011/0035733 A1 | 2/2011 | Horning |
| 2011/0154308 A1 | 6/2011 | Lobo |
| 2011/0225234 A1 | 9/2011 | Amit |
| 2011/0231305 A1 | 9/2011 | Winters |
| 2011/0320816 A1 * | 12/2011 | Yao ..................... G06F 21/316 713/171 |
| 2012/0022942 A1 * | 1/2012 | Holloway ............. G06F 16/958 705/14.49 |
| 2012/0036576 A1 | 2/2012 | Iyer |
| 2012/0090030 A1 | 4/2012 | Rapaport |
| 2012/0198528 A1 | 8/2012 | Baumhof |
| 2012/0254727 A1 | 10/2012 | Jain |
| 2012/0255006 A1 | 10/2012 | Aly et al. |
| 2012/0324236 A1 | 12/2012 | Srivastava |
| 2013/0047255 A1 | 2/2013 | Dalcher |
| 2013/0086679 A1 | 4/2013 | Beiter |
| 2013/0219492 A1 | 8/2013 | Call |
| 2013/0239195 A1 | 9/2013 | Turgeman |
| 2013/0263264 A1 | 10/2013 | Klein |
| 2013/0273882 A1 | 10/2013 | Walsh |
| 2014/0040051 A1 | 2/2014 | Ovick |
| 2014/0096194 A1 | 4/2014 | Bhogavilli |
| 2014/0101236 A1 | 4/2014 | Dietrich |
| 2014/0208198 A1 | 7/2014 | Ayoub |
| 2014/0298469 A1 | 10/2014 | Marion |
| 2014/0304816 A1 | 10/2014 | Klein |
| 2014/0310392 A1 | 10/2014 | Ho |
| 2015/0058992 A1 | 2/2015 | El-Moussa |
| 2015/0067031 A1 | 3/2015 | Acharya |
| 2015/0067866 A1 | 3/2015 | Ibatullin |
| 2015/0112892 A1 | 4/2015 | Kaminsky |
| 2015/0262183 A1 | 9/2015 | Gervais |
| 2015/0278491 A1 | 10/2015 | Horning |
| 2015/0281263 A1 | 10/2015 | McLaughlin |
| 2015/0358338 A1 | 12/2015 | Zeitlin |
| 2015/0379266 A1 | 12/2015 | McLaughlin |
| 2016/0005029 A1 | 1/2016 | Ivey |
| 2016/0072829 A1 | 3/2016 | Call |
| 2016/0119344 A1 | 4/2016 | Freitas Fortuna dos Santos |
| 2016/0191554 A1 | 6/2016 | Kaminsky |
| 2016/0342793 A1 | 11/2016 | Hidayat |
| 2016/0344769 A1 | 11/2016 | Li |
| 2016/0378989 A1 | 12/2016 | Park |
| 2017/0012960 A1 | 1/2017 | Idika |
| 2017/0013012 A1 | 1/2017 | Hansen |
| 2017/0048260 A1 | 2/2017 | Peddemors |
| 2017/0201540 A1 | 7/2017 | Call |
| 2017/0235954 A1 | 8/2017 | Kurupati |
| 2017/0237766 A1 | 8/2017 | Mattson |
| 2017/0257383 A1 | 9/2017 | Ficarra |
| 2017/0257385 A1 | 9/2017 | Overson |
| 2017/0293748 A1 | 10/2017 | Kurupati |
| 2018/0205747 A1 | 7/2018 | Ficarra |
| 2018/0255154 A1 | 9/2018 | Li |

(56) References Cited

U.S. PATENT DOCUMENTS

| | | |
|---|---|---|
| 2019/0081977 A1 | 3/2019 | Yang |
| 2019/0141064 A1 | 5/2019 | Call |
| 2019/0182251 A1 | 6/2019 | Jampani |
| 2019/0215304 A1 | 7/2019 | Yang |
| 2019/0245858 A1 | 8/2019 | Idika |
| 2019/0268359 A1 | 8/2019 | Zhang |
| 2019/0327265 A1 | 10/2019 | Zhao |
| 2019/0364019 A1 | 11/2019 | Yang |
| 2019/0373012 A1 | 12/2019 | Mattson |

FOREIGN PATENT DOCUMENTS

| | | | |
|---|---|---|---|
| WO | WO2008/095031 | 8/2008 | |
| WO | WO2008/130946 | 10/2008 | |
| WO | WO-2010019258 A1 * | 2/2010 | ............... G06F 9/54 |
| WO | WO-2010111169 A1 * | 9/2010 | ............ G06F 21/36 |
| WO | WO2017/007705 | 1/2017 | |
| WO | WO2017/007936 | 1/2017 | |
| WO | WO2017/074622 | 5/2017 | |

OTHER PUBLICATIONS

CTNF, mailed on Mar. 9, 2017, re: Siying Yang, U.S. Appl. No. 14/925,547, filed Oct. 28, 2015.
NOA, mailed on Apr. 23, 2015, re: Justin Call, U.S. Appl. No. 13/527,025, filed Jun. 19, 2012.
CTFR, mailed on Feb. 10, 2015, re: Justin Call, U.S. Appl. No. 13/527,025, filed Jun. 19, 2012.
CTNF, mailed on Nov. 2, 2012, re: Justin Call, U.S. Appl. No. 13/527,025, filed Jun. 19, 2012.
CTFR, mailed on Apr. 23, 2013, re: Justin Call, U.S. Appl. No. 13/527,025, filed Jun. 19, 2012.
CTNF, mailed on Aug. 4, 2014, re: Justin Call, U.S. Appl. No. 13/527,025, filed Jun. 19, 2012.
NOA, mailed on Jun. 1, 2015, re: Justin Call, U.S. Appl. No. 13/527,025, filed Jun. 19, 2012.
CTNF, mailed on Feb. 26, 2015, re: Justin Call, U.S. Appl. No. 14/055,576, filed Oct. 16, 2013.
NOA, mailed on Nov. 16, 2016, re: Justin Call, U.S. Appl. No. 14/980,409, filed Dec. 28, 2015.
CTNF, mailed on Aug. 2, 2016, re: Justin Call, U.S. Appl. No. 14/980,409, filed Dec. 28, 2015.
CTFR, mailed on Nov. 18, 2016, re: Justin D. Call, U.S. Appl. No. 14/672,879, filed Mar. 30, 2015.
CTNF, mailed on Jun. 1, 2017, re: Siying Yang, U.S. Appl. No. 14/942,769, filed Nov. 16, 2015.
CTNF, mailed on Jun. 2, 2017, re: Ariya Hidayat, U.S. Appl. No. 15/224,978, filed Aug. 1, 2016.
CTNF, mailed on Apr. 7, 2017, re: Yao Zhao, U.S. Appl. No. 14/861,906, filed Sep. 22, 2015.
CTNF, mailed on May 25, 2017, re: Daniel G. Moen, U.S. Appl. No. 14/980,231, filed Dec. 28, 2015.
CTNF, mailed on Jul. 26, 2017, re: Bei Zhang, U.S. Appl. No. 14/859,084, filed Sep. 18, 2015.
CTNF, mailed on Jun. 21, 2017, re: Zhiwei Li, U.S. Appl. No. 14/718,736, filed May 21, 2015.
CTNF, mailed on Aug. 30, 2017, re: Justin D. Call, U.S. Appl. No. 15/470,715, filed Mar. 27, 2017.
CTFR, mailed on Sep. 5, 2017, re: Siying Yang, U.S. Appl. No. 14/925,547, filed Oct. 28, 2015.
CTNF, mailed on Oct. 19, 2017, re: Jarrod S. Overson, U.S. Appl. No. 15/059,080, filed Mar. 2, 2016.
NOA, mailed on Oct. 25, 2017, re: Michael J. Ficarra, U.S. Appl. No. 15/060,322, filed Mar. 3, 2016.
CTNF, mailed on Nov. 13, 2017, re: Nwokedi Idika, U.S. Appl. No. 14/728,596, filed Jun. 2, 2015.
CTNF, mailed on Dec. 13, 2017, re: Justin D. Call, U.S. Appl. No. 15/645,787, filed Jul. 10, 2017.
NOA, mailed on Dec. 18, 2017, re: Yao Zhao, U.S. Appl. No. 14/861,906, filed Sep. 22, 2015.
NOA, mailed on Jan. 5, 2018, re: Yao Zhao, U.S. Appl. No. 14/861,906, filed Sep. 22, 2015.
NOA, mailed on Jan. 9, 2018, re: Justin D. Call, U.S. Appl. No. 15/470,715, filed Mar. 27, 2017.
CTFR, mailed Jan. 25, 2018, re: Siyang Yang, U.S. Appl. No. 14/942,769, filed Nov. 16, 2015.
CTNF, mailed on Feb. 7, 2017, re: Daniel G. Moen, U.S. Appl. No. 14/980,231, filed Dec. 28, 2015.
CTFR, mailed on Jan. 10, 2018, re: Bei Zhang, U.S. Appl. No. 14/859,084, filed Sep. 18, 2015.
NOA, mailed on Jan. 25, 2018, re: Zhiwei Li, U.S. Appl. No. 14/718,736, filed May 21, 2015.
CTNF, mailed on Mar. 30, 2018, re: Michael J. Ficarra, U.S. Appl. No. 15/060,380, filed Mar. 3, 2016.
CTNF, mailed on Apr. 19, 2018, re: Michael J. Ficarra, U.S. Appl. No. 15/919,034, filed Mar. 12, 2018.
CTNF, mailed on May 15, 2018, re: Marc R. Hansen, U.S. Appl. No. 15/202,755, filed Jul. 6, 2016.
CTFR, mailed on May 10, 2018, re: Nwokedi Idika, U.S. Appl. No. 14/728,596, filed Jun. 2, 2015.
CTNF, mailed on Feb. 16, 2018 re: Siying Yang, U.S. Appl. No. 15/068,468, filed Mar. 11, 2016.
NOA, mailed on May 18, 2018, re: Siying Yang, U.S. Appl. No. 14/942,769, filed Nov. 16, 2015.
CTNF, mailed on May 23, 2018, re: Bei Zhang, U.S. Appl. No. 14/859,084, filed Sep. 18, 2015.
CTFR, mailed on May 17, 2018, re: Jarrod S. Overson, U.S. Appl. No. 15/059,080, filed Mar. 2, 2016.
CTNF, mailed on Jun. 7, 2018, re: Siying Yang, U.S. Appl. No. 14/925,547, filed Oct. 28, 2015.
CTNF, mailed on Jun. 29, 2018, re: Timothy Dylan Peacock, U.S. Appl. No. 15/137,824, filed Apr. 25, 2016.
CTNF, mailed on Feb. 21, 2018, re: Nwokedi Idika, U.S. Appl. No. 15/204,710, filed Jul. 7, 2016.
NOA, mailed on Aug. 13, 2018, re: Daniel G. Moen, U.S. Appl. No. 14/980,231, filed Dec. 28, 2015.
NOA, mailed on Sep. 5, 2018, re: Daniel G. Moen, U.S. Appl. No. 14/980,231, filed Dec. 28, 2015.
NOA, mailed on Sep. 17, 2018, re: Siying Yang, U.S. Appl. No. 14/942,769, filed Nov. 16, 2015.
NOA, mailed on Sep. 5, 2018, re: Michael J. Ficarra, U.S. Appl. No. 15/919,304, filed Mar. 12, 2018.
NOA, mailed on Jul. 5, 2018, re: Siying Yang, U.S. Appl. No. 15/068,468, filed Mar. 11, 2016.
NOA, mailed on Sep. 19, 2018, re: Nwokedi Idika, U.S. Appl. No. 15/204,710, filed Jul. 7, 2016.
CTNF, mailed on Sep. 19, 2018, re: Eli Mattson, U.S. Appl. No. 15/430,224, filed Feb. 10, 2017.
CTFR, mailed on Sep. 11, 2018, re: Michael J. Ficarra, U.S. Appl. No. 15/060,380, filed Mar. 3, 2016.
CTFR, mailed on Nov. 1, 20181, re: Marc. R. Hansen, U.S. Appl. No. 15/202,755, filed Jul. 6, 2016.
CTFR, mailed on Nov. 30, 2018, re: Siying Yang, U.S. Appl. No. 14/925,547, filed Oct. 28, 2015.
NOA, mailed on Nov. 27, 2018, re: Nwokedi Idika, U.S. Appl. No. 15/204,710, filed Jul. 7, 2016.
CTNF, mailed on Oct. 5, 2018, re: Zhiwei Li, U.S. Appl. No. 15/968,573, filed May 1, 2018.
NOA, mailed on Sep. 12, 2018, re: Justin D. Call, U.S. Appl. No. 15/645,787, filed Jul. 10, 2017.
CTNF, mailed on Nov. 19, 2018, re: Jarrod S. Overson, U.S. Appl. No. 15/059,080, filed Mar. 2, 2016.
NOA, mailed on Jan. 3, 2019, re: Bei Zhang, U.S. Appl. No. 14/859,084, filed Sep. 18, 2015.
CTNF, mailed on Jan. 24, 2019, re: Nwokedi Idika, U.S. Appl. No. 14/728,596, filed Jun. 2, 2015.
NOA, mailed on Feb. 6, 2019, re: Eli Mattson, U.S. Appl. No. 15/430,224, filed Feb. 10, 2017.
NOA, mailed on Mar. 25, 2019, re: Siying Yang, U.S. Appl. No. 14/925,547, filed Oct. 28, 2015.

(56) References Cited

OTHER PUBLICATIONS

CTFR, mailed on Apr. 15, 2019, re: Jarrod S. Overson, U.S. Appl. No. 15/059,080, filed Mar. 2, 2016.
NOA, mailed on Mar. 11, 2019, re: Zhiwei Li, U.S. Appl. No. 15/968,573, filed May 1, 2018.
CTNF, mailed on May 15, 2019, re: Michael J. Ficarra, U.S. Appl. No. 15/060,380, filed Mar. 3, 2016.
NOA, mailed on Jun. 3, 2019, re: Siying Yang, U.S. Appl. No. 16/190,015, filed Nov. 13, 2018.
CTFR, mailed on Jul. 1, 2019, re: Nwokedi Idika , U.S. Appl. No. 14/728,596, filed Jun. 2, 2015.
CTNF, mailed on Sep. 4, 2019, re: Timothy Dylan Peacock, U.S. Appl. No. 15/137,824, filed Apr. 25, 2016.
CTNF, mailed on Aug. 14, 2019: Nwokedi Idika, U.S. Appl. No. 16/236,520, filed Dec. 30, 2018.
CTNF, mailed on Sep. 4, 2019, re: Justin D. Call, U.S. Appl. No. 16/234,848, filed Dec. 28, 2018.
CTNF, mailed on Sep. 4, 2019, re: Bei Zhang, U.S. App. No. 16/413,451, filed May 15, 2019.
U.S. Appl. No. 16/190,105, filed Mar. 14, 2016, Sying Yang.
Detection and Analysis of Drive-by-Download Attacks and Malicious JavaScript Code, Apr. 26, 2010.
Defending Browsers against Drive-by Downloads: Mitigating Heap-spraying Code Injection Attacks, Sep. 9, 2009.
Intrusion Detection using Sequences of System calls, Aug. 18, 1998.
Recent Java exploitation trends and malware, Jul. 26, 2012.
DoDOM: Leveraging DOM Invariants for Web 2.0 Application Robustness Testing, Nov. 1, 2010.
Cujo: Efficient Detection and Prevention of Drive-by-Download Attacks, Dec. 6, 2010.
Design and Implementation of a Distributed Virtual Machine for Networked Computers, 1999.
International Search Report, dated Sep. 22, 2016, PCT/US16/40645.
International Search Report, dated Feb. 16, 2017, PCT/US16/53472.
International Search Report, dated Oct. 11, 2016, PCT/US16/41337.
International Search Report, dated Jul. 1, 2016, PCT/US16/25092.
International Search Report, dated Aug. 1, 2014, PCT/US14/24232.
International Search Report, dated Jun. 3, 2013, PCT/US13/26516.
DuPaul, Neil, "Common Malware Types: Cybersecurity 101", Veracode, Oct. 12, 2012, 9 pages, Oct. 12, 2012.
Friendly Bit, "Rendering a web page—step by step", published Jan. 11, 2010, pp. 1-2, Jan. 11, 2010.
"Custom Elements: defining new elements in HTML", Dec. 8, 2013, 15 pages, Dec. 8, 2013.
NOA, mailed on Aug. 21, 2015, re: Justin Call U.S. Appl. No. 14/055,576, filed Oct. 16, 2013.
CTNF, mailed on May 20, 2015, re: Justin Call, U.S. Appl. No. 14/110,659, filed Oct. 8, 2013.
NOA, mailed on Aug. 19, 2015, re: Daniel Moen, U.S. Appl. No. 14/160,107, filed Jan. 21, 2014.
CTNF, mailed on Jun. 27, 2014, re: Justin Call, U.S. Appl. No. 14/255,248, filed Apr. 17, 2014.
NOA, mailed on Nov. 19, 2014, re: Justin Call, U.S. Appl. No. 14/255,248, filed Apr. 17, 2014.
NOA, mailed on Dec. 24, 2014, re: Justin Call, U.S. Appl. No. 14/255,248, filed Apr. 17, 2014.
CTNF, mailed on Sep. 1, 2015, re: Ariya Hidayat, U.S. Appl. No. 14/293,895, filed Jun. 2, 2014.
NOA, mailed on Mar. 30, 2016, re: Ariya Hidayat, U.S. Appl. No. 14/293,895, filed Jun. 2, 2014.
NOA, mailed on Jul. 21, 2016, re: Siying Yang, U.S. Appl. No. 14/541,062, filed Nov. 13, 2014.
CTNF, mailed on Feb. 23, 2016, re: Siying Yang, U.S. Appl. No. 14/541,062, filed Nov. 13, 2014.
CTNF, mailed on May 8, 2015, re: Timothy Peacock, U.S. Appl. No. 14/570,632, filed Dec. 15, 2014.
NOA, mailed on Dec. 18, 2015, re: Timothy Peacock, U.S. Appl. No. 14/570,632, filed Dec. 15, 2014.
CTNF, mailed on Mar. 17, 2016, re: Justin Call, U.S. Appl. No. 14/672,879, filed Mar. 30, 2015.
CTNF, mailed on Nov. 10, 2016, re: Nwokedi Idike, U.S. Appl. No. 14/728,621, filed Jun. 2, 2015.
CTNF, mailed on Mar. 14, 2016, re: Justin Call, U.S. Appl. No. 14/874,717, filed Oct. 5, 2015.
NOA, mailed on Apr. 28, 2016, re: Justin Call, U.S. Appl. No. 14/874,717, filed Oct. 5, 2015.
NOA, dated Oct. 3, 2019, re: Marc R. Hansen, U.S. Appl. No. 15/202,755, filed Jul. 6, 2016.
CTNF, dated Sep. 24, 2019, re: Ganesh Jampani, U.S. Appl. No. 16/259,890, filed Jan. 28, 2019.
NOA, dated Oct. 17, 2019, re: Michael J. Ficarra, U.S. Appl. No. 15/060,380, filed Mar. 3, 2016.
NOA, dated Dec. 3, 2019, re: Nwokedi Idika, U.S. Appl. No. 16/236,520, filed Dec. 30, 2018.
CTNF, dated Dec. 11, 2019, re: Siying Yang, U.S. Appl. No. 16/236,519, filed Dec. 30, 2018.
NOA, dated Dec. 11, 2019, re: Jarrod S. Overson, U.S. Appl. No. 15/059,080, filed Mar. 2, 2016.
U.S. Appl. No. 16/457,589, filed Oct. 24, 2019, Zhiwei Li.

\* cited by examiner

SPLIT SERVING OF COMPUTER CODE

CROSS-REFERENCE TO RELATED APPLICATIONS

This application claims the benefit under 35 U.S.C. § 120 as a Continuation of U.S. patent application Ser. No. 15/204,710, filed on 2016-7-7, which claims priority under 35 U.S.C. § 119(e)(1), to U.S. Provisional Application Ser. No. 62/189,664, filed on Jul. 7, 2015, the entire contents of which are incorporated herein by reference.

TECHNICAL FIELD

This document generally describes technology related to computer security, including in the improvement of computer operation for securing access to sensitive data.

BACKGROUND

Operators of web server systems and other systems that serve content to the public face a number of challenges. Computer fraudsters may interfere with the serving of content by placing code on computers of unsuspecting users, where that code may intercept communications between the computers and the web server systems for illicit purposes, such as identifying passwords and other credentialing information. Fraudsters may also form botnets for attacking content providers, such as for making attempts to access those content providing systems using stolen credentials or for performing denial of service attacks in a coordinated manner on a content provider. Alternatively, legitimate systems may repeatedly request content from such content providing systems as a means of scraping the content, e.g., to perform indexing for a search engine. Any or all of these activities may place risks on a content serving system and/or put problematic loads on them, and may require distinguishing legitimate activity from illegitimate.

SUMMARY

This document generally describes computer-based technology for improving security of computer systems. As described here, a system may identify that a request has been made to a content serving system to have content served, and may institute a process for testing the bona tides of the requester. For example, code may be provided to a client that made the request, where the code may perform a number of tests on the client to determine whether it is likely a human-controlled client or a bot-controlled client. If the tests indicate the client is human-controlled, the client's request may be forwarded to a web server system or other such system to which the request was directed, and content may be served to the client (though perhaps with security countermeasures applied to it). If the tests indicate that the client is most likely bot-controlled, access may be denied to it or false content (which looks like the true requested content) may be provided to the client in order to further test it. If the initial test is less determinant (it does not point strongly to the client being legitimate or illegitimate), the client may be further tested, such as by serving a CAPTCHA or similar test to confirm whether the client is human-controlled or not. Such follow-up tests may be harder for a bot to perform or fake (and thus more likely to lead to resolution of whether the client is legitimate or illegitimate than were the initial tests), but also more intrusive on a legitimate user of a client (though such invasiveness can be tolerated because it does not occur often, and it gives valuable information that was not generated by the initial tests).

The particular testing described here may be performed by a security intermediary that is separate from the web server system or other content server system. For example, a company that serves content may contract with a security service company to be provided with a security intermediary to which requests to the content server system are rerouted (e.g., the security server system serves as a proxy for the content server system). The security intermediary may serve the code for testing the client, which may be termed "reconnaissance code," and may make the determination whether to pass a request from the client to the content server system. In certain circumstances, the intermediary may also provide security countermeasures to whatever content is ultimately served to the client, such as by applying polymorphic transformations to the content, as described in more detail below.

In one implementation, a computer-implemented method for securing a content server system is disclosed and comprises identifying that a request has been made by a client computing device for serving of content from the content server system; serving, to the client computing device and for execution on the client computing device, reconnaissance code that is programmed to determine whether the client computing device is human-controlled or bot-controlled; receiving, from the reconnaissance code, data that indicates whether the client computing device is human-controlled or bot-controlled; and serving follow-up content to the client computing device, wherein the make-up of the follow-up content is selected based on a determination of whether the client computing device is human-controlled or bot-controlled. Any or each of the steps of the method may be performed by an intermediary security system that is separate and distinct from the content server system.

In certain aspects, the reconnaissance code is arranged to identify on the client computing device configuration information that indicates whether the client computing device is configured for a human user. The reconnaissance code can also be arranged to identify on the client computing device operational information that indicates how the client computing device is operated after the reconnaissance code is provided to the client computing device. The method can additionally comprise, in response to determining that the client computing device may be bot-controlled, serving to the client computing device code for performing a challenge-response test to a user of the client computing device, wherein the challenge-response test can be solved only by a human user.

In some aspects, serving follow-up content comprises serving fake code that is not the content from the content server system, in response to determining that the client computing device is bot-controlled. Also, the fake code obtains data for determining an identity of the bot or bot operator and sends the obtained data to a central security server system. Moreover, serving follow-up content can comprise serving the content from the content server system, with one or more polymorphic transformations applied to the content in locations that do not affect functional performance of the content on the client computing device.

In other implementations, each of the actions described in the proceeding paragraphs can be carried out by instructions stored on media of one or more tangible, non-transitory data storage devices. The actions may also be carried out by a system having such data storage devices in communication with one or more computer processors.

In certain implementations, the systems and techniques discussed here may provide one or more advantages. For example, a content provider may readily add a capability to its system to identify when requests are being made of it that are legitimate request that human-operated client devices. Such a content provider may, in appropriate circumstances, prevent fraud from being perpetrated on it or its customers, may conserve scarce processing resources, and may ensure that content served to legitimate requesters is served reliably and quickly. In addition, by ensuring that most content is being served to human users, content metrics such as advertisement clicks can be determined to be more accurate than otherwise. In these ways, the techniques described here improve the operation and security of a computer system and portions of a computer system in a convenient and readily-implementable manner.

The details of one or more embodiments are set forth in the accompanying drawings and the description below. Other features and advantages will be apparent from the description and drawings, and from the claims.

DESCRIPTION OF DRAWINGS

Like reference symbols in the various drawings indicate like elements.

DETAILED DESCRIPTION

This document generally describes computer-based systems and techniques that can be used to serve content to a requesting client device in a more secure manner. As described in more detail below, when a client device makes a request for content, such as requesting the serving of a web page, the client device can initially be served reconnaissance code that is programmed to execute on the client device to obtain information about the client device and the manner in which it is operating. Such gathered information may be used to make a determination of whether the client device is likely operated by a human or by a bot. That determination may then result in the client device being handled in a particular way by a security sub-system and/or a content serving sub-system, such as by affecting the content the client device is served in response to its request.

FIGS. 1A-1D are conceptual representations of an access control system for an origin server system 106. In general, a scenario 100 is shown by way of analogy to a human security guard 104 controlling access to the origin server system 106. The particular analogy shown here is provided in very simplified form to assist in understanding the more technical description of the technological mechanisms for providing access control described in more detail below, which improve the operations of the computer system itself over approaches that do not use such techniques.

Figure 1A:
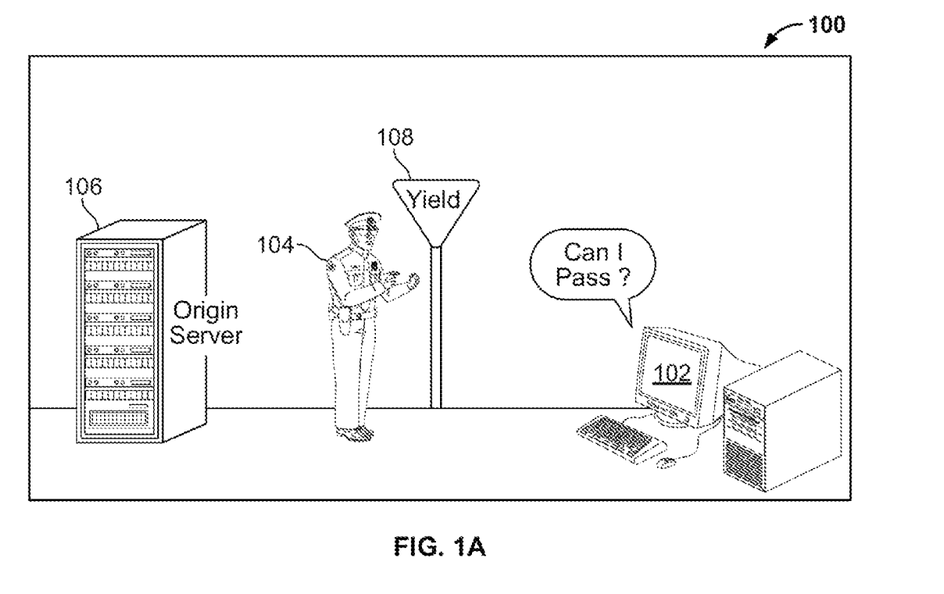
FIGS. 1A-1D are conceptual representations of an access control system for an origin server system.

In FIG. 1A, there is shown an origin server system 106 and a client computing device 102 that wants to obtain access to the origin server system 106. In a typical example, the origin server system 106 may include a number of different server subsystems, including a Web server subsystem to serve webpages and associated content to members of the public that request such content. For example, the origin server system 106 may be operated by a banking organization to provide personal banking to customers of the organization, or by an internet retailer to implement an online catalog ordering system.

In the figure, the client computing device 102 is shown as asking permission to access the origin server system 106. In a typical implementation, such a request may occur in the form of an HTTP request, and the client computing device 102 may not know about the presence of the security guard 104 that the origin server system 106 has hired for protection. The yield sign 108 is representative of the security guard 104, which may represent an intermediate security system that sits in front of the origin server system 106, intercepting attempts to communicate with the origin server system 106 (e.g., acting as a proxy server system for the origin server system 106).

Figure 1B:
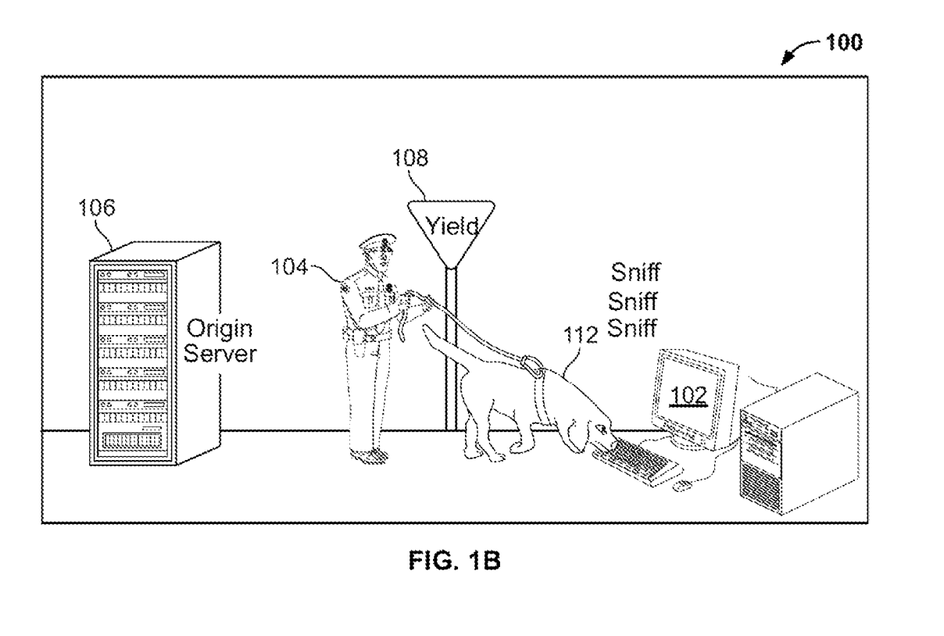

FIG. 1B shows a next step of the analogy, where the security guard 104 has deployed a guard dog 112 to analyze the client computing device 102. Just as a guard dog 112 may be trained to sniff out particular indications of illicit activity, such as the smell of drugs or explosives, software by analogy may be programmed to sniff out indications of illegitimate activity at the client computing device 102. For example, the guard dog 112 may determine that the client computing device 102 is not what it pretends to be, such as identifying that a device ID tag for the client computing device 102 was falsely submitted by the client computing device 102. The guard 104 may use the guard dog 112 for such a task, either because the guard 104 cannot approach the client computing device 102, or the guard 104 does not have the ability to test the client computing device 102 in the same manner as a guard dog 112. By analogy, a security intermediary computer system may send out reconnaissance code to execute on the computing device 102 because the security intermediary computer system is incapable of closely observing the client computing device 102 from a distance. For example, if the security intermediary system interrogated the client computing device 102 remotely, the responses would be more easily faked than if the security intermediary system sent code to execute right on the client computing device 102.

Figure 1C:
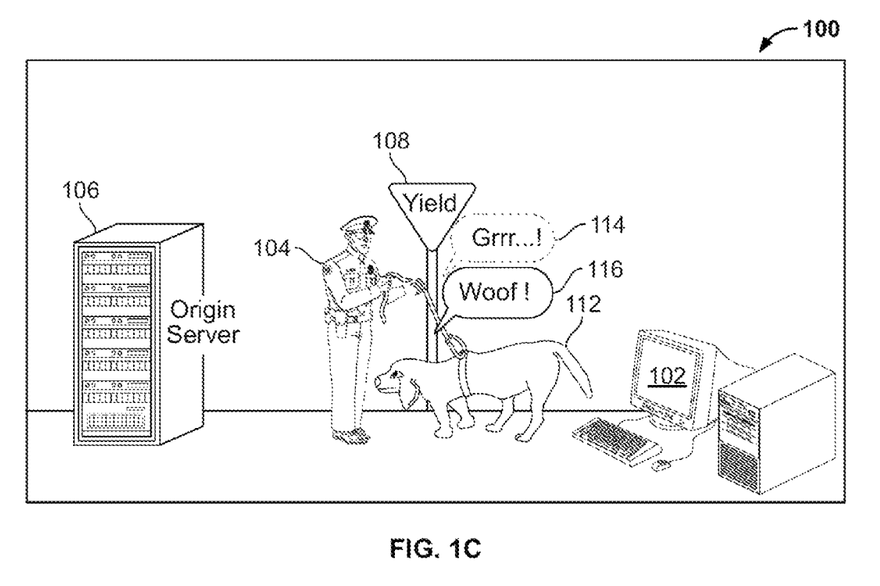

In FIG. 1C, the security dog 112 reports back to the security guard 104. In this example, the dog 112 growls 114 if the client computing device 102 does not appear to be legitimate, such as if it has been taken over by a bot. Alternatively, the dog 112 may bark happily 116 if the client computing device 102 does check out. The security intermediary system in the form of security guard 104 may then interpret the report from the guard dog 112 as appropriate.

Figure 1D:
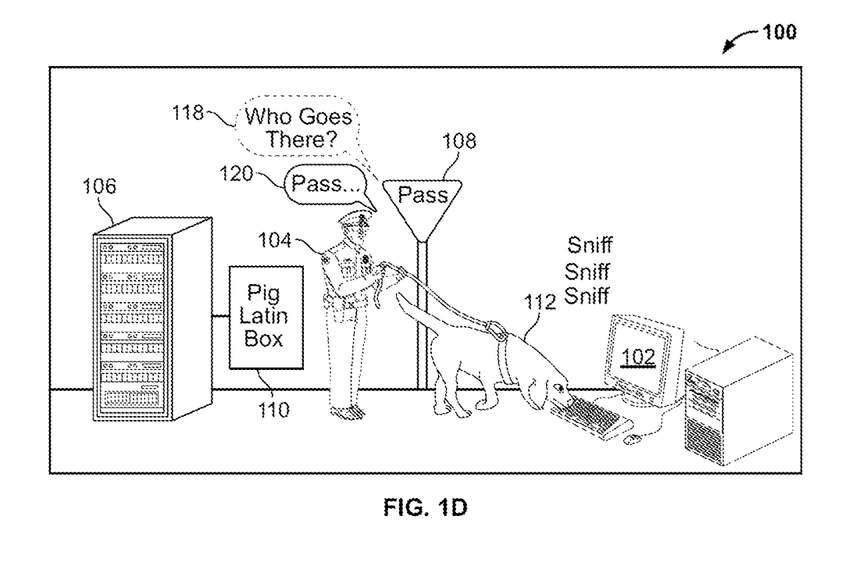

In FIG. 1D, the security guard 104 makes a determination based on the feedback he has received from guard dog 112. Action 118 indicates a response based on guard dog 112 growling at the client computing device 102 (indicator 114). In this example, the response involves the security guard 104 asking further inquiries of the client computing device 102. By analogy, a security intermediary may provide additional tests to the client computing device 102, such as a CAPTCHA or other mechanism for determining whether client device 102 is operated by a human or by a bot.

Action 120 shows the guard 104 allowing the client computing device 102 to pass. This action is made in response to the guard dog 112 barking happily (indicator 116). By analogy, a security intermediary may allow the request for content that the client computing device directed toward the origin server system 106 to pass freely to the origin server system 106. Nonetheless, the system may still assume that the client computing device 102 could be a bot or otherwise be controlled by an illegitimate party. As a result, the system may apply security countermeasures to the content that is served by the origin server system 106. In this example, Pig Latin box 112 (again, a rough analogy) applies such countermeasures (e.g., recoding transmitted text into Pig Latin) to prevent an illicit party at client computing device 102 from interfering with the served content. By analogy, the countermeasures may include polymorphic recoding of content that is served by the origin server system 106, as explained in more detailed below.

Figure 1E:
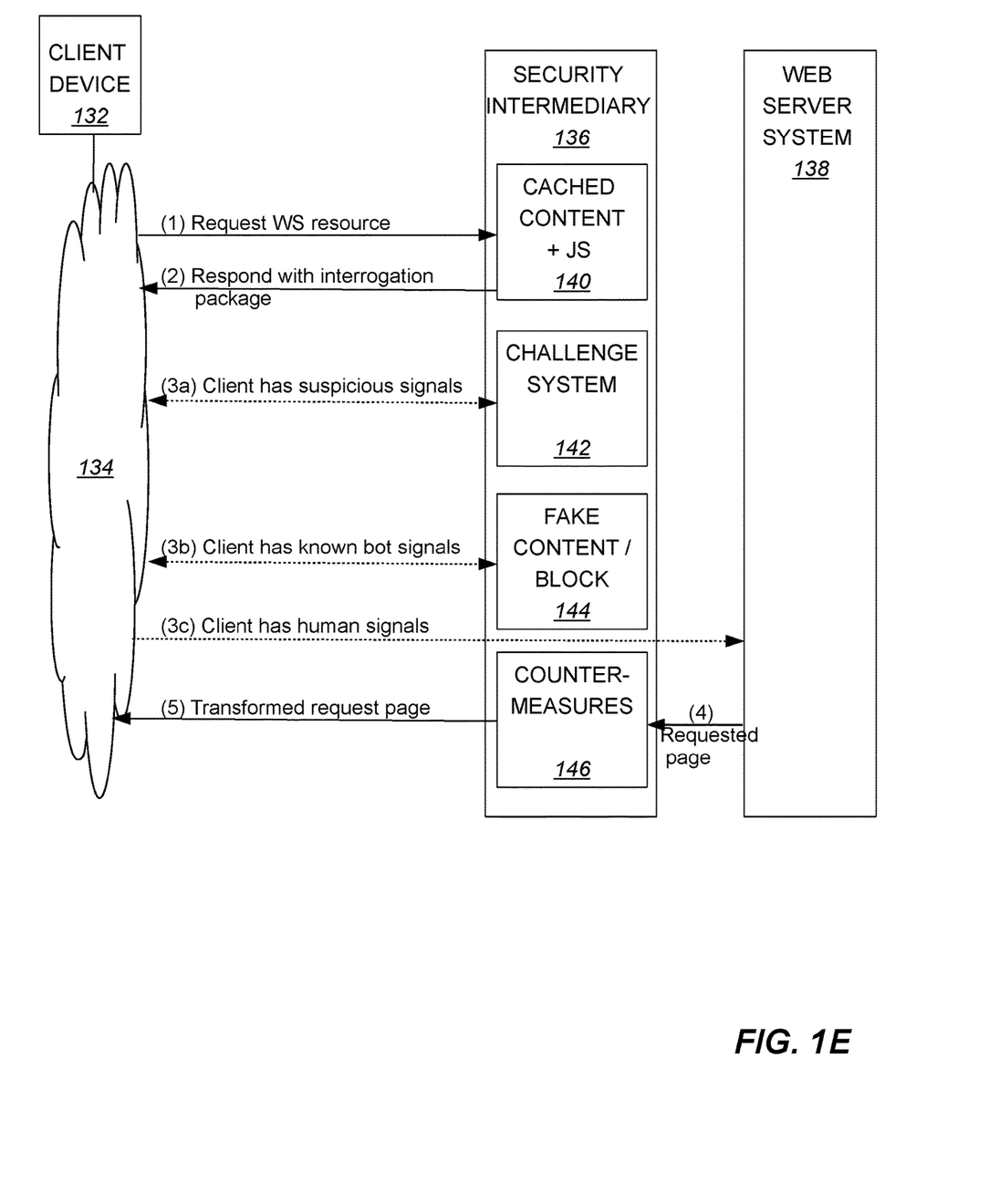
FIG. 1E is a schematic diagram a system for blocking credential stuffing attacks.

FIG. 1E is a schematic diagram of a system 130 for blocking credential stuffing attacks. In general, the system 130 may be programmed to implement split serving of code that at a highest level, is analogous to the guard dog example indicated in FIGS. 1A-1D.

In this example, three main subsystems are involved. A Web server system 138 represents a variety of content providers, such as those providing content websites that the public may access (e.g. banks, social networks, on-line retailers, restaurant rating sites, and the like). A security intermediary 136 is a separate and distinct system from the Web server system 138. The security intermediary 136 may be provided by a third party that is separate from the operator of the Web server system 138, and may be operated by such party, or may be operated by the same organization that operates Web server system 138. The security intermediary 136 is located logically, and perhaps physically, between the Web server system 138 and a public network such as the Internet 134. The security intermediary 136 can therefore monitor communications going into an out of the Web server system 138 and perform appropriate actions on such communications to ensure the security of the Web server system 138 and users of the Web server system 138.

A client device 132 is shown to be representative of a large number of client devices that may seek to access content from the Web server system 138. Client device 132 may take a variety of forms such as a desktop computer, smartphone, tablet computer, and other forms. Particular client devices may be legitimately operated by a human in ordinary manner by which a human may enter addresses for web pages by typing them or selecting favorites, and in other familiar manners. Particular client devices may also be automated, such as in legitimate search engine web scraping devices. Such devices may place different amount of load on Web server system 138 based on how often they attempt to scrape Web server system 138 and how they perform such scraping. Client device 132 may also be automatic and controlled as part of a botnet for an illegitimate organization.

The process arrows connecting the basic components indicate a typical process that may be carried out by the system 130. A first arrow indicates a request from client device 132 for Web server resources (e.g., an HTTP request that includes a URL and perhaps other information). Such a request may be intercepted by the security intermediary 136, which may determine that the particular client device 132 has not yet been verified by the system 130, and thus could be a web scraper or other automated client device that could be harmful to Web server system 138—or could be a bot controlled by malware. As a result, security intermediary 136 serves cached content and JavaScript 142 to the client device 132.

The cached content may take a form of basic content from the Web server system 138, but not be the complete number of resources that were requested by the client device 132. For example, the cached content may be static content for a web page that the client device requested, such as a page-specific menu bar, other page chrome, CSS information, and other such data that may be needed to generate the requested resources in full, but that do not constitute sensitive parts of the resources (such as login resources, particular shopping cart resources, and the like) or that do not require extensive computing in order to serve (like dynamically-generated content might). In certain implementations, the cached content may be invisible to a user of the client device, or may include visible content (e.g., a textual message that announces that a web page is in the process of loading) and invisible content. For example, cached interrogation content may be included with a page-specific menu bar and an initially empty page. Successful interrogation interaction may occur while the user sees the menu bar appear, and may return the remainder of the content and dynamically write that content into the initially-loaded content.

The reconnaissance code could also generate a request for the portion of the content from the origin server system that would allow, e.g., a browser to make a final protected request. For example, the cachable content in one example could include all elements for a web page except an "add to cart" button or form. This secondary, follow-up content may initially be withheld from serving until a determination can be made that the client device is likely human-controlled, and can then be served to the client device, and otherwise withheld. That way, the user can have a rich experienced with the content that does not need to be secured, and still soon receive the content that does need security (the add to cart button, which fraudsters may use to improperly order goods using another person's credentials).

Such content may be served in the form it was created by an origin system, or can be re-coded, including using polymorphic transformations across different servings of the page to client devices determined to be human-controlled. The request for the remainder of the content (e.g., the add to cart button) could be performed after interrogating the browser at a random or arbitrary time on a configurable interval. The variability in the timing can be used to help distribute load from such requests for a popular resource or a resource determined to be computationally-intensive (e.g., certain types of dynamic content). Note that the static requests could be made to a CON that is more able to handle spikes in load, whereas the follow-up content may be delivered from a more secure, dynamic, and central source that may not be as able to handle spikes (including spikes caused by OOOOS attacks), so that the selection of a different delay period before causing the follow-up content to be served can help smooth the serving load on such server systems.

Some or all of the cached content may be cached at the security intermediary or at a separate system, such as in a distributed content delivery network (CON) or other subsystem that provides for more efficient generation and serving of web resources (as compared to central serving at the origin server), such as by serving them from a location that is closer to the client device. Wherever it is cached, the cached content may be regenerated or refreshed over time, where the triggering of an update may occur periodically or in response to a triggering event such as a push notification from a content provisioning system. Such updated content may be provided by the origin system, or an intermediary. Where the updating is periodic, the periodicity may depend on how often the content is typically updated and on the criticality of having updated content.

The cached content, as noted, may include basic static content for a web page or other resources, and content for performing reconnaissance and for performing interrogation of a human user at the client device. Such interrogation content may be "surfaced" immediately or only upon the reconnaissance code determining that the client device might be bot-operated and that additional verification of the device would be wise.

As noted, JavaScript that is served by the security system may include reconnaissance code that is programmed to execute on the client device and make observations about the status of the client device. For example, the code may determine a current configuration of the client device 132, including types of hardware installed on the client device 132. Such information may be used by the code or by the security intermediary 136 to determine that the client device is hiding its configuration based on information it provided with its request, or that the client device 132 is inconsistent with a device that would be used by a typical computer user. For example, the client device 132 may be determined to have video capabilities that are inconsistent with those of a computer that is being used by a user, but is instead consistent with a computer that does not have a human user. The code that is sent to client device 132 may also make determinations about the manner in which client device is the, so as to indicate whether it is being used by human or controlled by a bot. For example, the cash content or JavaScript that is served to the client device 132 may call for interaction by a user of the client device 132. The manner in which such interaction is determined to occur may indicate whether that interaction is the true human user or is instead a bot that is scripted to respond to such content or code. For example, mouse movements or typing rate may indicate that the invoice are provided by a human or by a bot.

The client device 132 may, via execution of the JavaScript 140, send back to the security intermediary 136 data gathered from such monitoring. The data may be in relatively raw form or in an analyzed form—i.e., the reconnaissance code may simply send back data it has gathered and/or it may perform analysis on the data such as by making a determination of the likelihood that a client device is bot-operated based on a combination of multiple different parameters for the device that the code has identified. In particular, the code may send back data that simply indicates particular configuration parameters for the client device 132, or may also or alternatively send back an indication that the various parameters suggests that the device is bot controlled or instead human controlled. Where the ultimate conclusion is not formed by the code executing on the client device 132, such a determination may be made at the security intermediary by way of various mechanisms, including expert rules programmed by a learning system, basic formulas that take into account multiple inputs and weightings for each such input, or other relevant mechanisms.

The security intermediary 136 in this example uses such inputs to make one of three categorizations for the client device 132, though other approaches may be employed in other examples. A first determination is an indefinite determination indicated by arrow 3a, which involves a challenge system 142 performing a challenge of the client device 132 so as to resolve the ambiguity in such a determination. Such a challenge may take a form that is hard for a bot to succeed at, and generally requires a human response or success, such as a CAPTCHA challenge and response. If the client device 132 succeeds at the challenge in response, it may then be given access to the requested content as indicated for arrow 5 below.

Arrow 3b indicates actions that occur when the security intermediary 136 determines that the client device 132 is most likely to be controlled by a bot rather than by a human. In such a situation, the client device 132 may have its request for content blocked, in certain situations, may be served fake content 140 that appears to a bot like the content that it requested, but that is not such content. For example, if the box was attempting to access a webpage for transferring money between bank accounts, a mocked up account transfer page may be supplied to the client device 132 so that the bot on the device 132 attempts to make such a transfer. Information received from such interaction by malware on the client device 132 with the fake content 140 may help an security organization determine the identity of the organization operating the bot, such as by being able to focus on a particular bank account into which someone is trying to transfer money across multiple different client devices and banking customers.

Arrow 3c indicates actions that occur when the security intermediary 136 determines that the client device 132 is most likely legitimately operated by a human operator. In such a situation, the security intermediary 136 may take the request that it originally received at arrow 1 and has subsequently stored, and may forward that request to Web server system 138. The Web server system 138 may, without knowledge that all of the foregoing operations have occurred, serve the content that the client device 132 has requested, as indicated by arrow 4. Even though the security intermediary 136 has determined that the client device 132 is probably operated by a human and is probably a client device, for additional security, it may applied countermeasures 146 to the content that the Web server system 138 serves. It may do so by intercepting the content served by the Web server system 138, and re-coding the content in a variety of manners to make the content more difficult for a bot or other actor at the client device 132 from exploiting.

Arrow 5 shows this serving of a transformed requested webpage to the client device. Particular mechanisms for transforming the served code, including by applying polymorphic transformations that cause the code to vary from one serving to the next so as to form a moving target for any fraud system that is trying to automatically analyze the content or automatically interact with it, are described in more detail with respect to FIG. 2 next.

Figure 2:
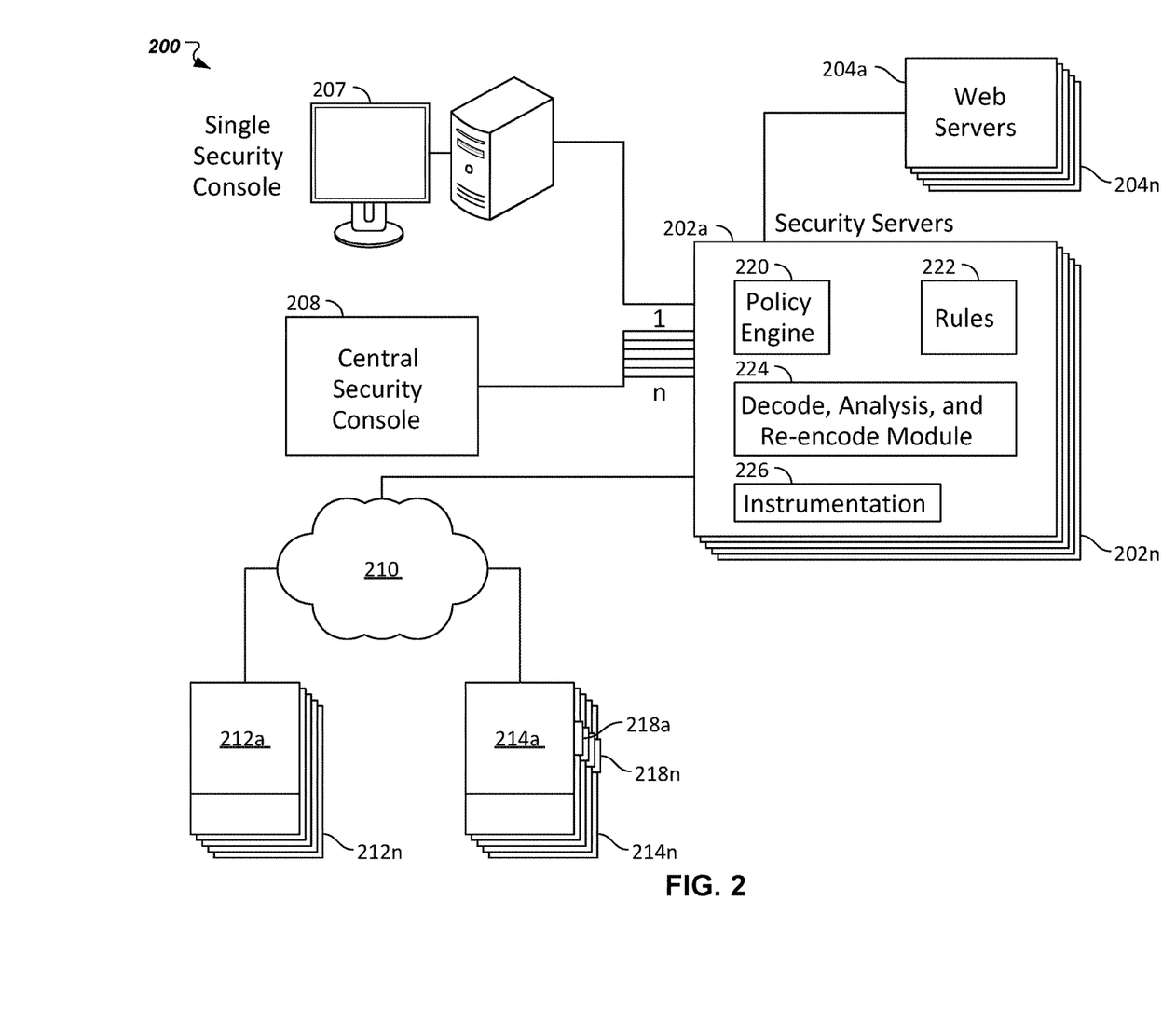
FIG. 2 is a block diagram of a system for serving transformed content from a content server system.

FIG. 2 is a block diagram of a system for serving transformed content from a content server system, including polymorphic and instrumented code. The system 200 may be adapted to perform deflection and detection of malicious activity with respect to a web server system. The system 200 may also make determinations about whether each particular client with which it interacts is likely controlled by a human or by a bot, and may react accordingly as described in more detail above and below.

The system 200 in this example is a system that is operated by or for a large number of different businesses that serve web pages and other content over the internet, such as banks and retailers that have on-line presences (e.g., on-line stores, or on-line account management tools). The main server systems operated by those organizations or their agents are designated as web servers 204a-204n, and could include a broad array of web servers, content servers, database servers, financial servers, load balancers, and other necessary components (either as physical or virtual servers).

A set of security server systems 202a to 202n are shown connected between the web servers 204a to 204n and a network 210 such as the Internet. Although both extend ton in number, the actual number of subsystems could vary. For example, certain of the customers could install two separate security server systems to serve all of their web server systems (which could be one or more), such as for redundancy purposes. The particular security server systems 202a-202n may be matched to particular ones of the web server systems 204a-204n, or they may be at separate sites, and all of the web servers for various different customers may be provided with services by a single common set of security servers 202a-202n (e.g., when all of the server systems are at a single co-location facility so that bandwidth issues are minimized).

Each of the security server systems 202a-202n may be arranged and programmed to carry out operations like those discussed above and below, and other operations. For example, a policy engine 220 in each such security server system may evaluate HTTP requests from client computers (e.g., desktop, laptop, tablet, and smartphone computers) based on header and network information, and can set and store session information related to a relevant policy. The policy engine may be programmed to classify requests and correlate them to particular actions to be taken to code returned by the web server systems before such code is served back to a client computer. The policy engine or another component may also cause reconnaissance software to be served to client devices and may receive reports back from such software in the manners discussed above and below.

When such code or data from the code returns, the policy information may be provided to a de-code, analysis, and re-encode module 224, which matches the content to be delivered, across multiple content types (e.g., HTML, JavaScript, and CSS), to actions to be taken on the content (e.g., using XPATH within a DOM), such as substitutions, addition of content, and other actions that may be provided as extensions to the system. For example, the different types of content may be analyzed to determine naming that may extend across such different pieces of content (e.g., the name of a function or parameter), and such names may be changed in a way that differs each time the content is served, e.g., by replacing a named item with randomly-generated characters. Elements within the different types of content may also first be grouped as having a common effect on the operation of the code (e.g., if one element makes a call to another), and then may be re-encoded together in a common manner so that their interoperation with each other will be consistent even after the re-encoding.

Both the analysis of content for determining which transformations to apply to the content, and the transformation of the content itself, may occur at the same time (after receiving a request for the content) or at different times. Such application of transformations to the content may follow the serving of reconnaissance code and the analysis of data sent back by such code, to determine whether the underlying content from the web server systems should be provided to the client device, even in secured form. For example, the analysis may be triggered, not by a request for the content, but by a separate determination that the content newly exists or has been changed. Such a determination may be via a "push" from the web server system reporting that it has implemented new or updated content. The determination may also be a "pull" from the security servers 202a-202n, such as by the security servers 202a-202n implementing a web crawler (not shown) like web crawler 162 in FIG. 1 to recursively search for new and changed content and to report such occurrences to the security servers 202a-202n, and perhaps return the content itself and perhaps perform some processing on the content (e.g., indexing it or otherwise identifying common terms throughout the content, creating DOMs for it, etc.). The analysis to identify portions of the content that should be subjected to polymorphic modifications each time the content is served may then be performed according to the manner discussed above and below.

A rules engine 222 may store analytical rules for performing such analysis and for re-encoding of the content. The rules engine 222 may be populated with rules developed through operator observation of particular content types, such as by operators of a system studying typical web pages that call JavaScript content and recognizing that a particular method is frequently used in a particular manner. Such observation may result in the rules engine 222 being programmed to identify the method and calls to the method so that they can all be grouped and re-encoded in a consistent and coordinated manner.

The de-code, analysis, and re-encode module 224 encodes content being passed to client computers from a web server according to relevant policies and rules. The module 224 also reverse encodes requests from the client computers to the relevant web server or servers. For example, a web page may be served with a particular parameter, and may refer to JavaScript that references that same parameter. The de-code, analysis, and re-encode module 224 may replace the name of that parameter, in each of the different types of content, with a randomly generated name, and each time the web page is served (or at least in varying sessions), the generated name may be different. When the name of the parameter is passed back to the web server, it may be re-encoded back to its original name so that this portion of the security process may occur seamlessly for the web server.

A key for the function that encodes and de-codes such strings can be maintained by the security server system 202 along with an identifier for the particular client computer so that the system 202 may know which key or function to apply, and may otherwise maintain a state for the client computer and its session. A stateless approach may also be employed, whereby the system 202 encrypts the state and stores it in a cookie that is saved at the relevant client computer. The client computer may then pass that cookie data back when it passes the information that needs to be de-coded back to its original status. With the cookie data, the system 202 may use a private key to decrypt the state information and use that state information in real-time to de-code the information from the client computer. Such a stateless implementation may create benefits such as less management overhead for the server system 202 (e.g., for tracking state, for storing state, and for performing clean-up of stored state information as sessions time out or otherwise end) and as a result, higher overall throughput.

The de-code, analysis, and re-encode module 224 and the security server system 202 may be configured to modify web code differently each time it is served in a manner that is generally imperceptible to a user who interacts with such web code. For example, multiple different client computers may request a common web resource such as a web page or web application that a web server provides in response to the multiple requests in substantially the same manner. Thus, a common web page may be requested from a web server, and the web server may respond by serving the same or substantially identical HTML, CSS, JavaScript, images, and other web code or files to each of the clients in satisfaction of the requests. In some instances, particular portions of requested web resources may be common among multiple requests, while other portions may be client or session specific. The de-code, analysis, and re-encode module 224 may be adapted to apply different modifications to each instance of a common web resource, or common portion of a web resource, such that the web code that it is ultimately delivered to the client computers in response to each request for the common web resource includes different modifications.

Such modification may occur according to a process that analyzes the code once for each time it changes in a material way, and then applies the analysis multiple times. For example, elements that can be changed without affecting the presentation of a web page may be located by way of analysis, as may additional instances of those elements through all the code (e.g., HTML, CSS, and JavaScript). A mapping may be made of the types and locations of such elements. Then, each time the code is to be served, the mapping may be used to place random characters or other substitute content in place of each occurrence of each such element. This repeated process may be performed, in certain implementations, with much less computational overhead than would a combined reanalysis and substitution for every serving.

The security server system 202 can apply the modifications in a manner that does not substantially affect a way that the user interacts with the resource, regardless of the different transformations applied, even where different modifications are applied in responding to multiple requests for a common web resource. For example, when two different client computers request a common web page, the security server system 202 applies different modifications to the web code corresponding to the web page in response to each request for the web page, but the modifications do not substantially affect a presentation of the web page between the two different client computers. The modifications can therefore be made largely transparent to users interacting with a common web resource so that the modifications do not cause a substantial difference in the way the resource is displayed or the way the user interacts with the resource on different client devices or in different sessions in which the resource is requested.

In some implementations, the decode, analysis, and re-encode module 224 may be configured to generate challenges, insert challenges, and validate solutions to challenges that occur in requests from client computers. For example, the module 224 may determine parameters for an HMAC/SHA-2 hashing challenge, and insert code into content to be served that causes a client to compute a solution to the challenge. The module 224 may include, for example, a challenge generator and request validator in some implementations.

An instrumentation module 226 is programmed to add instrumentation code to the content that is served from a web server. The instrumentation code is code that is programmed to monitor the operation of other code that is served. For example, the instrumentation code may be programmed to identify when certain methods are called, when those methods have been identified as likely to be called by malicious software. When such actions are observed to occur by the instrumentation code, the instrumentation code may be programmed to send a communication to the security server reporting on the type of action that occurred and other metadata that is helpful in characterizing the activity. Such information can be used to help determine whether the action was malicious or benign.

The instrumentation code may also analyze the DOM on a client computer in predetermined manners that are likely to identify the presence of and operation of malicious software, and to report to the security servers 202 or a related system. For example, the instrumentation code may be programmed to characterize a portion of the DOM when a user takes a particular action, such as clicking on a particular on-page button, so as to identify a change in the DOM before and after the click (where the click is expected to cause a particular change to the DOM if there is benign code operating with respect to the click, as opposed to malicious code operating with respect to the click). Data that characterizes the DOM may also be hashed, either at the client computer or the server system 202, to produce a representation of the DOM (e.g., in the differences between part of the DOM before and after a defined action occurs) that is easy to compare against corresponding representations of DOMs from other client computers. Other techniques may also be used by the instrumentation code to generate a compact representation of the DOM or other structure expected to be affected by malicious code in an identifiable manner.

As noted, the content from web servers 204a-204n, as encoded by de-code, analysis, and re-encode module 224, may be rendered on web browsers of various client computers. Uninfected client computers 212a-212n represent computers that do not have malicious code programmed to interfere with a particular site a user visits or to otherwise perform malicious activity. Infected client computers 214a-214n represent computers that do have malware or malicious code (218a-218n, respectively) programmed to interfere with a particular site a user visits or to otherwise perform malicious activity. In certain implementations, the client computers 212, 214 may also store the encrypted cookies discussed above and pass such cookies back through the network 210. The client computers 212, 214 will, once they obtain the served content, implement DOMs for managing the displayed web pages, and instrumentation code may monitor the respective DOMs as discussed above. Reports of illogical activity (e.g., software on the client device calling a method that does not exist in the downloaded and rendered content) can then be reported back to the server system.

The reports from the instrumentation code may be analyzed and processed in various manners in order to determine how to respond to particular abnormal events, and to track down malicious code via analysis of multiple different similar interactions across different client computers 212, 214. For small-scale analysis, each web site operator may be provided with a single security console 208 that provides analytical tools for a single site or group of sites. For example, the console 208 may include software for showing groups of abnormal activities, or reports that indicate the type of code served by the web site that generates the most abnormal activity. For example, a security officer for a bank may determine that defensive actions are needed if most of the reported abnormal activity for its web site relates to content elements corresponding to money transfer operations—an indication that stale malicious code may be trying to access such elements surreptitiously.

Console 208 may also be multiple different consoles used by different employees of an operator of the system 200, and may be used for pre-analysis of web content before it is served, as part of determining how best to apply polymorphic transformations to the web code. For example, in combined manual and automatic analysis like that described above, an operator at console 208 may form or apply rules 222 that guide the transformation that is to be performed on the content when it is ultimately served. The rules may be written explicitly by the operator or may be provided by automatic analysis and approved by the operator. Alternatively, or in addition, the operator may perform actions in a graphical user interface (e.g., by selecting particular elements from the code by highlighting them with a pointer, and then selecting an operation from a menu of operations) and rules may be written consistent with those actions.

A central security console 208 may connect to a large number of web content providers, and may be run, for example, by an organization that provides the software for operating the security server systems 202a-202n—an organization separate from the organizations that serve the content. Such console 208 may access complex analytical and data analysis tools, such as tools that identify clustering of abnormal activities across thousands of client computers and sessions, so that an operator of the console 208 can focus on those clusters in order to diagnose them as malicious or benign, and then take steps to thwart any malicious activity.

In certain other implementations, the console 208 may have access to software for analyzing telemetry data received from a very large number of client computers that execute instrumentation code provided by the system 200. Such data may result from forms being re-written across a large number of web pages and web sites to include content that collects system information such as browser version, installed plug-ins, screen resolution, window size and position, operating system, network information, and the like. In addition, user interaction with served content may be characterized by such code, such as the speed with which a user interacts with a page, the path of a pointer over the page, and the like.

Such collected telemetry data, across many thousands of sessions and client devices, may be used by the console 208 to identify what is "natural" interaction with a particular page that is likely the result of legitimate human actions, and what is "unnatural" interaction that is likely the result of a bot interacting with the content. Statistical and machine learning methods may be used to identify patterns in such telemetry data, and to resolve bot candidates to particular client computers—i.e., to help determine whether a particular computer is controlled by a bot, and to determine which line of bots it belongs to if possible. Such client computers may then be handled in special manners by the system 200, may be blocked from interaction, or may have their operators notified that their computer is potentially running malicious software (e.g., by sending an e-mail to an account holder of a computer so that the malicious software cannot intercept it easily).

Figure 3:
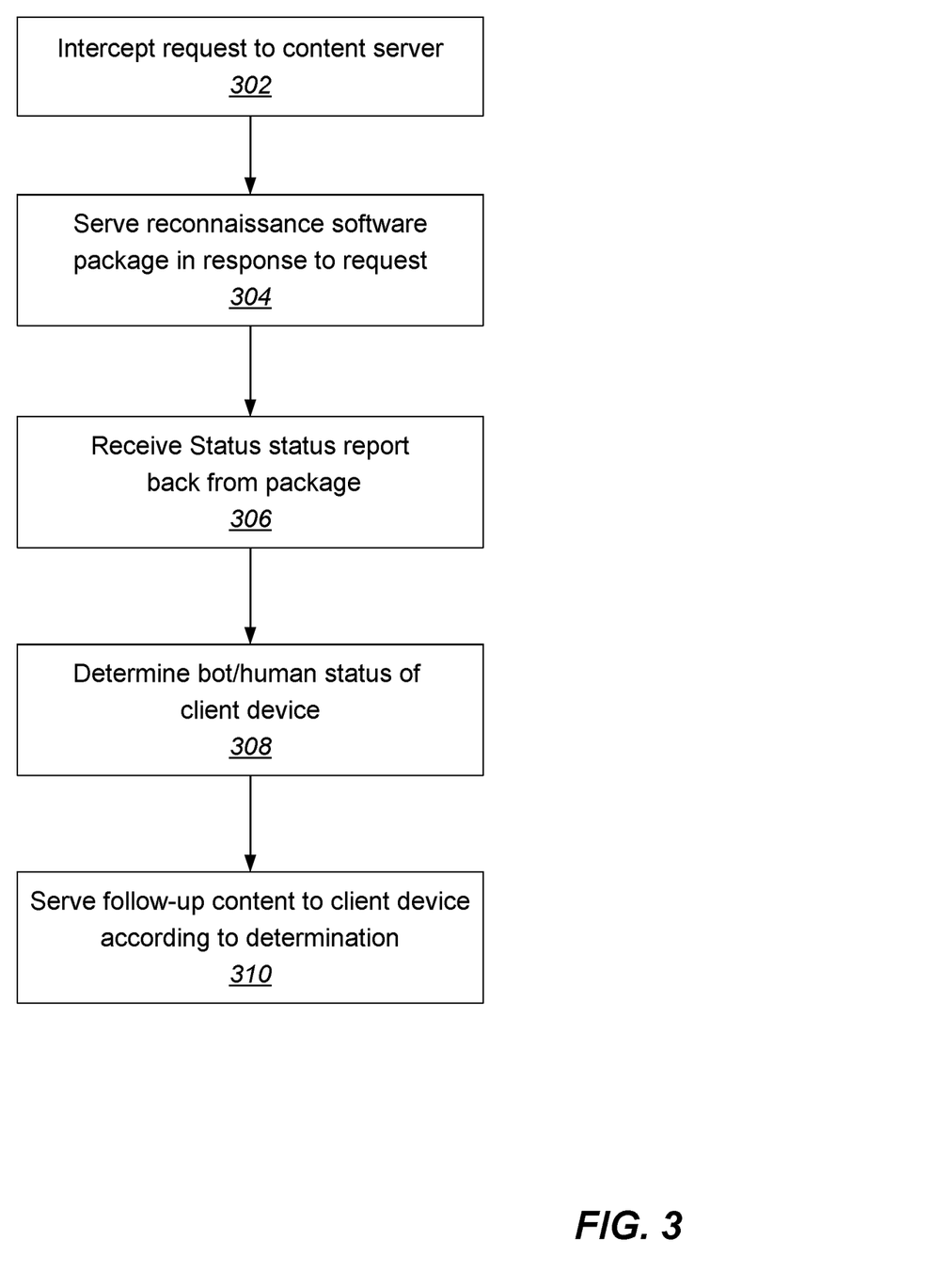
FIG. 3 is a flow diagram showing an example process for split serving of content in response to a client request.

FIG. 3 is a flow diagram showing an example process for split serving of content in response to a client request (e.g., where "split" indicates that part of the content such as static or unsecure content is first served, with secure content being served later, typically after code that executed with the rendering of the first content has reported back that the client device seems to be secure). In general, the process involves serving reconnaissance code that gathers information for determining whether a requesting client device is being operated by a human or by a bot, and then serving follow-up code based on such determination.

The process begins at box 302, where a security system intercepts a request that is made to a content server system. Such interception, may be performed in the manners discussed above, including using a DNS redirect for requests that are made to a Web server system.

At box 304, reconnaissance software is served to the client device that made the intercepted request to the content server. Such reconnaissance software may take a variety of forms, and may include content that appears to be a response to the request in addition to executable code programmed to execute on the client device to acquire data about various parameters of the client device, including data that indicates configurations for the client device, data that indicates hardware on the client device, and data that indicate how the client device is being operated by a human or bot user. The served software may execute automatically on the client device and then report back data automatically to the system that served it. Such data may be encrypted or otherwise protected from interference by the systems operating on the device, and may be caused to be transferred in a manner that the data "looks" like data being sent from content that the Web server system would have served.

At box 306, a status report is received back from the reconnaissance software. Such a report may include basic core data, such as a device ID for the device, information that identifies peripherals used with the device, information that identifies the operating system and version and the Web browser and version number, among other things. In certain implementation, the status report may also include results of analysis of the basic data that have been performed by the reconnaissance software.

At box 308, the bot-versus-human status of the client device may be determined, and a level of confidence in such determination may also be made. The determination may be made using data generated by the reconnaissance software in addition to other information, such as the time of day (perhaps bots are more active at particular times of day), the type of content provider (e.g., perhaps banks are more likely to be subject to bot attacks), the IP address for the device (e.g., perhaps bot attacks typically come from particular IP addresses), and similar information. All such information may be used, for example, to assign a score to the client device, such as where O means the device is very likely operated by a human and 100 means it is very likely operated by a bot.

At box 310, follow-up content is served based on the prior determination of the bot-versus-human status for control of the client device. On the one end, if the device is determined to be very likely human controlled, then the content that the device initially requested may be served to it—though with security countermeasures as discussed above with respect to FIG. 2. In the middle, the client device may be indeterminate with respect to whether it is human-controlled or bot-controlled. In such a situation, a challenge/response interaction may be performed by the security system, such as by serving a standard captcha to the client device, and determining whether the response at the device is proper. If it is, then the content can be served to the device from the origin server system (though perhaps with security countermeasures applied to it). At the other end of the spectrum, the security system may determine that the client device is most likely controlled by a bot. In such a situation, nothing may be served to the client device, fake content may be served, and/or content may be served that seeks additional information from the client device, such as to perhaps obtain human input at the client device and changed the categorization of the device from bot-operated to human-operated and/or to obtain information that will help the security system better characterize the bot activity, so that the security system can determine which bot net the bot belongs to, determines the attack profile for the bot net, and other such determinations that can be used in developing further countermeasures.

Figure 4:
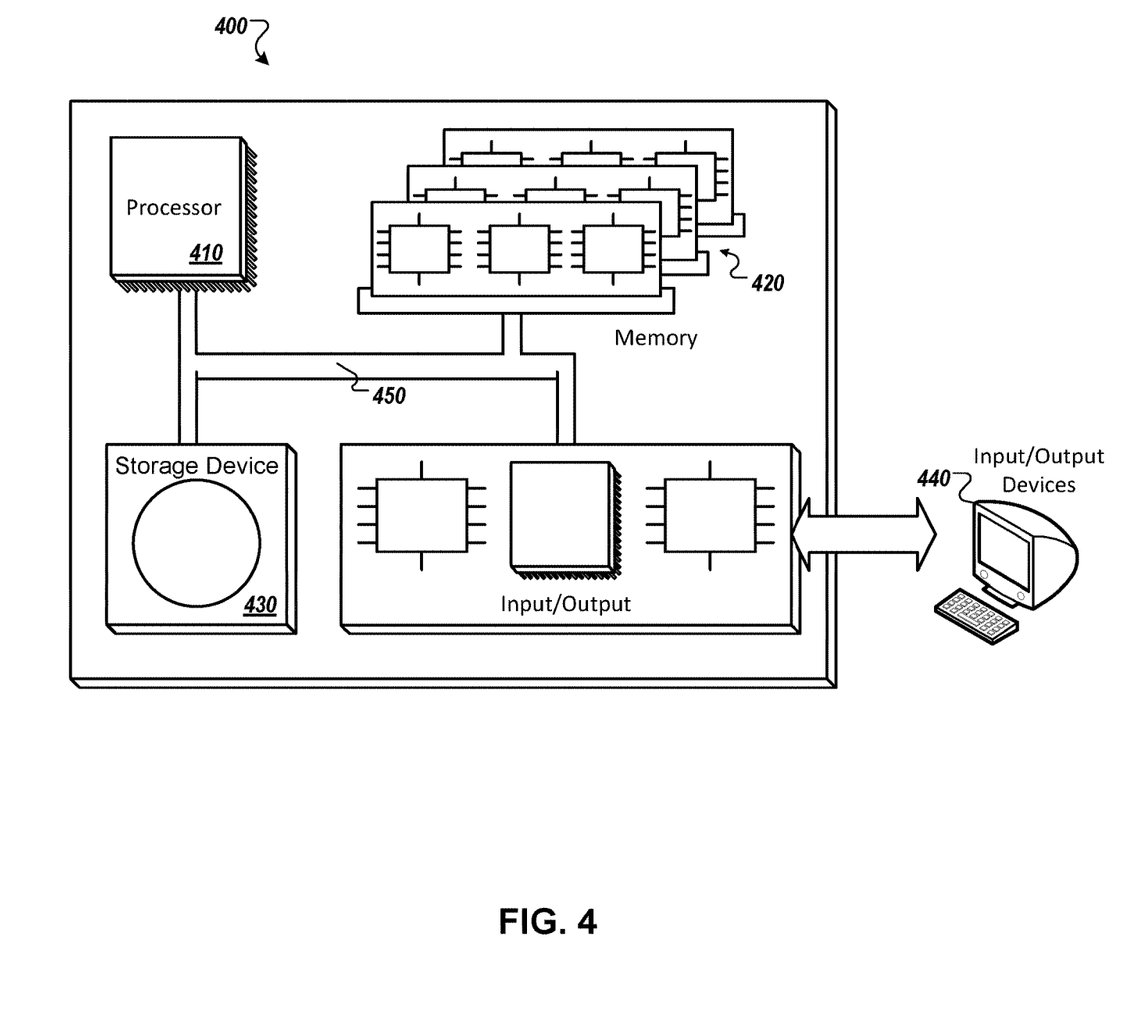
FIG. 4 is a schematic diagram of a computer system.

FIG. 4 is a schematic diagram of a computer system 400. The system 400 can be used to carry out the operations described in association with any of the computer-implemented methods described previously, according to one implementation. The system 400 is intended to include various forms of digital computers, such as laptops, desktops, workstations, personal digital assistants, servers, blade servers, mainframes, and other appropriate computers. The system 400 can also include mobile devices, such as personal digital assistants, cellular telephones, smartphones, and other similar computing devices. Additionally the system can include portable storage media, such as, Universal Serial Bus (USB) flash drives. For example, the USB flash drives may store operating systems and other applications. The USB flash drives can include input/output components, such as a wireless transmitter or USB connector that may be inserted into a USB port of another computing device.

The system 400 includes a processor 410, a memory 420, a storage device 430, and an input/output device 440. Each of the components 410, 420, 430, and 440 are interconnected using a system bus 450. The processor 410 is capable of processing instructions for execution within the system 400. The processor may be designed using any of a number of architectures. For example, the processor 410 may be a CISC (Complex Instruction Set Computers) processor, a RISC (Reduced Instruction Set Computer) processor, or a MISC (Minimal Instruction Set Computer) processor.

In one implementation, the processor 410 is a single-threaded processor. In another implementation, the processor 410 is a multi-threaded processor. The processor 410 is capable of processing instructions stored in the memory 420 or on the storage device 430 to display graphical information for a user interface on the input/output device 440.

The memory 420 stores information within the system 400. In one implementation, the memory 420 is a computer-readable medium. In one implementation, the memory 420 is a volatile memory unit. In another implementation, the memory 420 is a non-volatile memory unit.

The storage device 430 is capable of providing mass storage for the system 400. In one implementation, the storage device 430 is a computer-readable medium. In various different implementations, the storage device 430 may be a floppy disk device, a hard disk device, an optical disk device, or a tape device.

The input/output device 440 provides input/output operations for the system 400. In one implementation, the input/output device 440 includes a keyboard and/or pointing device. In another implementation, the input/output device 440 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machine-readable storage device for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer. Additionally, such activities can be implemented via touchscreen flat-panel displays and other appropriate mechanisms.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include a local area network ("LAN"), a wide area network ("WAN"), peer-to-peer networks (having ad-hoc or static members), grid computing infrastructures, and the Internet.

The computer system can include clients and servers. A client and server are generally remote from each other and typically interact through a network, such as the described one. The relationship of client and server arises by virtue of computer programs running on the respective computers and having a client-server relationship to each other.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer-implemented method for securing a content server system, the method comprising:
   identifying that a request has been made by a client computing device for serving of content from the content server system;
   serving, to the client computing device and for execution on the client computing device, reconnaissance code that is programmed to generate information for determining whether the client computing device is human-controlled or bot-controlled;
   receiving, from the reconnaissance code, data that indicates whether the client computing device is human-controlled or bot-controlled;
   determining that the client computing device is bot-controlled based on the data; and
   in response to determining that the client computing device is bot-controlled, serving, to the client computing device, follow-up content comprising fake code that is not the content from the content server system.

2. The computer-implemented method of claim 1, wherein the steps of identifying, receiving, and serving are performed by an intermediary security system that is separate and distinct from the content server system.

3. The computer-implemented method of claim 1, wherein the reconnaissance code is arranged to identify on the client computing device configuration information that indicates whether the client computing device is configured for a human user.

4. The computer-implemented method of claim 1, wherein the reconnaissance code is arranged to identify on the client computing device operational information that indicates how the client computing device is operated after the reconnaissance code is provided to the client computing device.

5. The computer-implemented method of claim 1, further comprising, in response to determining that the client computing device may be bot-controlled, serving to the client computing device code for performing a challenge-response test to a user of the client computing device, wherein the challenge-response test can be solved only by a human user.

6. The computer-implemented method of claim 1, wherein the fake code collects data about the bot controlling the client computing device when executed at the client computing device.

7. The computer-implemented method of claim 1, wherein serving follow-up content comprises serving the content from the content server system, with one or more polymorphic transformations applied to the content in locations that do not affect functional performance of the content on the client computing device.

8. The computer-implemented method of claim 1, wherein the fake code collects data when executed at the bot-controlled client computing device and sends the data to a central security server system.

9. The computer-implemented method of claim 6, wherein the fake code obtains data for determining an identify of the bot controlling the client computing device.

10. The computer-implemented method of claim 6, wherein the fake code obtains data for determining an identify of a bot operator of the bot controlling the client computing device.

11. A computer system comprising:
    one or more hardware processors;
    at least one memory coupled to the one or more hardware processors and storing one or more instructions which, when executed by the one or more hardware processors, cause the one or more hardware processors to:
    identify that a request has been made by a client computing device for serving of content from the content server system;
    serve, to the client computing device and for execution on the client computing device, reconnaissance code that is programmed to generate information for determining whether the client computing device is human-controlled or bot-controlled;
    receive, from the reconnaissance code, data that indicates whether the client computing device is human-controlled or bot-controlled;
    determine that the client computing device is bot-controlled based on the data; and
    in response to determining that the client computing device is bot-controlled, serve, to the client computing device, follow-up content comprising fake code that is not the content from the content server system.

12. The computer system of claim 11, wherein the steps of identifying, receiving, and serving are performed by an intermediary security system that is separate and distinct from the content server system.

13. The computer system of claim 11, wherein the reconnaissance code is arranged to identify on the client computing device configuration information that indicates whether the client computing device is configured for a human user.

14. The computer system of claim 11, wherein the reconnaissance code is arranged to identify on the client computing device operational information that indicates how the client computing device is operated after the reconnaissance code is provided to the client computing device.

15. The computer system of claim 11, wherein the actions further comprise, in response to determining that the client computing device may be bot-controlled, serving to the client computing device code for performing a challenge-response test to a user of the client computing device, wherein the challenge-response test can be solved only by a human user.

16. The computer system of claim 11, wherein the fake code collects data about the bot controlling the client computing device when executed at the client computing device.

17. The computer system of claim 11, wherein serving follow-up content comprises serving the content from the content server system, with one or more polymorphic transformations applied to the content in locations that do not affect functional performance of the content on the client computing device.

18. The computer system of claim 11, wherein the fake code collects data when executed at the bot-controlled client computing device and sends the data to a central security server system.

19. The computer system of claim 16, wherein the fake code obtains data for determining an identify of the bot controlling the client computing device.

20. The computer system of claim 16, wherein the fake code obtains data for determining an identify of a bot operator of the bot controlling the client computing device.

* * * * *